United States Patent
Sangster et al.

(10) Patent No.: US 11,612,110 B2
(45) Date of Patent: Mar. 28, 2023

(54) ENVIRONMENTAL PARAMETERS FOR GROWING CROPS UNDER HIGH INTENSITY LIGHTING

(71) Applicant: FLUENCE BIOENGINEERING, INC., Austin, TX (US)

(72) Inventors: Sean Sangster, Austin, TX (US); Abhay Thosar, Schaumburg, IL (US)

(73) Assignee: FLUENCE BIOENGINEERING, INC., Austin, TX (US)

( * ) Notice: Subject to any disclaimer, the term of this patent is extended or adjusted under 35 U.S.C. 154(b) by 128 days.

(21) Appl. No.: 17/088,626

(22) Filed: Nov. 4, 2020

(65) Prior Publication Data
US 2022/0132746 A1    May 5, 2022

(51) Int. Cl.
| | |
|---|---|
| *A01G 7/04* | (2006.01) |
| *A01G 9/24* | (2006.01) |
| *H05B 47/16* | (2020.01) |
| *H05B 45/10* | (2020.01) |

(52) U.S. Cl.
CPC .............. *A01G 7/045* (2013.01); *A01G 9/249* (2019.05); *H05B 45/10* (2020.01); *H05B 47/16* (2020.01)

(58) Field of Classification Search
CPC ...... Y02A 40/146; Y02A 50/30; Y02A 40/25; Y02A 40/28; Y02A 40/20; Y02A 40/818; Y02A 50/20
See application file for complete search history.

(56) References Cited

U.S. PATENT DOCUMENTS

| | | | |
|---|---|---|---|
| 2014/0007266 A1* | 1/2014 | Assmann | C12Y 306/05002 800/312 |
| 2014/0223603 A1* | 8/2014 | Xu | C12N 15/8279 800/290 |
| 2014/0298544 A1* | 10/2014 | Li | C12N 15/8269 800/278 |
| 2019/0309271 A1* | 10/2019 | Hoffman | C12N 9/88 |
| 2020/0134741 A1 | 4/2020 | Bongartz et al. | |
| 2020/0184153 A1* | 6/2020 | Bongartz | G06N 5/04 |
| 2020/0253129 A1 | 8/2020 | Nicole et al. | |

(Continued)

FOREIGN PATENT DOCUMENTS

| | | |
|---|---|---|
| EP | 3771330 A1 | 2/2021 |
| JP | 2017184721 A * | 10/2017 |
| WO | WO-2021076782 A1 * | 4/2021 |

*Primary Examiner* — Monica C King

(57) ABSTRACT

Systems and methods disclosed herein include a method of illuminating plants in an indoor farming environment, including illuminating one or more plants using one or more lighting fixtures at a light intensity of approximately 1500 $\mu mol/m^2/s$ during a daytime period, wherein each lighting fixtures comprises one or more LEDs, determining whether a daytime temperature of the indoor farming environment is within a daytime temperature range, adjusting the daytime temperature to be within the daytime temperature range in response to determining that the daytime temperature of the indoor farming environment is outside of the daytime temperature range, determining whether a daytime humidity of the indoor farming environment is within a daytime humidity range, and adjusting the daytime humidity to be within the daytime humidity range in response to determining that the daytime humidity of the indoor farming environment is outside of the daytime humidity range.

20 Claims, 5 Drawing Sheets

(56) References Cited

U.S. PATENT DOCUMENTS

| | | | |
|---|---|---|---|
| 2020/0347399 A1* | 11/2020 | Hemerly | C12N 15/8273 |
| 2021/0315169 A1* | 10/2021 | Thomas | A01G 9/246 |
| 2022/0022381 A1* | 1/2022 | Li | F21V 14/006 |
| 2022/0132746 A1* | 5/2022 | Sangster | A01G 7/045 47/58.1 LS |

* cited by examiner

ENVIRONMENTAL PARAMETERS FOR GROWING CROPS UNDER HIGH INTENSITY LIGHTING

FIELD OF THE DISCLOSURE

This disclosure relates to horticultural lighting, and specifically to systems and methods for adjusting environmental parameters to improve crop growth under high intensity lighting.

BACKGROUND

Horticultural lighting is an important part of indoor farming environments. Traditionally, high pressure sodium (HPS) lamps were used for indoor farming illumination. More recently, light emitting diodes (LEDs) have become more popular as they consume less power than HPS lamps and are more cost effective. In addition, LEDs generate less heat, and thus pose less danger of accidentally overheating the plants while illuminating them.

Various light parameters, such as intensity, wavelength, and lighting duration (e.g., photoperiod) may have large impact on the growth of various crops. Other environmental parameters also affect plant growth, such as temperature, humidity, water quality, and soil quality. Some of these parameters may be interconnected. For example, a change in one parameter may affect the trajectory of a plant's growth (for example, by changing time until maturation or changing the quality of the leaves or fruit on the plant) unless other parameters are also changed to compensate.

One important lighting parameter for horticultural lighting is photosynthetic photon flux density (PPFD). PPFD is a measure of how much light is received over a certain area (e.g., the grow area) per unit time and is measured in units of micromoles per meters squared per second ($\mu mol/m^2/s$). When using LED fixtures to grow plants, it is important to monitor the PPFD received by the plant. If the PPFD is too low, the plants do not receive enough light for sufficient photosynthesis and fail to grow properly. Conversely, the if the PPFD is too high, the high intensity may actually cause damage to plant tissue without substantially increasing the rate of photosynthesis. Thus each type of crop usually has an ideal range of PPFD for optimal growth. For example, for cannabis plants it is generally recommended to have a PPFD in the range of 650-950 $\mu mol/m^2/s$, and it is not recommended to go above 1000 $\mu mol/m^2/s$. However, there are certain advantages to growing plants under high PPFD conditions, including higher crop yields. Thus what is needed in the art are systems and methods to ensure healthy plant growth under high PPFD conditions.

SUMMARY

Various implementations disclosed herein include a method of illuminating plants in an indoor farming environment. The method includes illuminating one or more plants using one or more lighting fixtures at a light intensity of approximately 1500 $\mu mol/m^2/s$ during a daytime period, wherein each lighting fixtures includes one or more light emitting diodes (LEDs), determining whether a daytime temperature of the indoor farming environment is within a daytime temperature range, adjusting the daytime temperature to be within the daytime temperature range in response to determining that the daytime temperature of the indoor farming environment is outside of the daytime temperature range, determining whether a daytime humidity of the indoor farming environment is within a daytime humidity range, and adjusting the daytime humidity to be within the daytime humidity range in response to determining that the daytime humidity of the indoor farming environment is outside of the daytime humidity range.

In some implementations, the method further includes turning off the one or more lighting fixtures during a nighttime period, determining whether a nighttime temperature of the indoor farming environment is within a nighttime temperature range, adjusting the nighttime temperature to be within the nighttime temperature range in response to determining that the nighttime temperature of the indoor farming environment is outside of the nighttime temperature range, determining whether a nighttime humidity of the indoor farming environment is within a nighttime humidity range, and adjusting the nighttime humidity to be within the nighttime humidity range in response to determining that the nighttime humidity of the indoor farming environment is outside of the nighttime humidity range. In some implementations, the nighttime temperature range is between 72-75° F. In some implementations, the nighttime humidity range is between 55-60%. In some implementations, the nighttime period is 12 hours long.

In some implementations, the daytime temperature range is between 81-83° F. In some implementations, the daytime humidity range is between 55-60%. In some implementations, the daytime period is 12 hours long. In some implementations, the one or more plants include cannabis plants. In some implementations, the cannabis plants are in the flowering stage. In some implementations, the light intensity is 1500 $\mu mol/m^2/s$ plus or minus a tolerance percentage.

Further implementations include a system for illuminating one or more plants in an indoor farming environment. The system includes one or more lighting fixtures configured to illuminate the one or more plants at a light intensity of approximately 1500 $\mu mol/m^2/s$ during a daytime period, wherein each lighting fixtures includes one or more light emitting diodes (LEDs), one or more sensors for measuring temperature and humidity in the indoor farming environment, and a processor coupled to the one or more lighting fixtures and the one or more sensors, the processor configured to determine whether a daytime temperature of the indoor farming environment is within a daytime temperature range, adjust the daytime temperature to be within the daytime temperature range in response to determining that the daytime temperature of the indoor farming environment is outside of the daytime temperature range, determine whether a daytime humidity of the indoor farming environment is within a daytime humidity range, and adjust the daytime humidity to be within the daytime humidity range in response to determining that the daytime humidity of the indoor farming environment is outside of the daytime humidity range.

In some implementations, the processor further configured to turn off the one or more lighting fixtures during a nighttime period, determine whether a nighttime temperature of the indoor farming environment is within a nighttime temperature range, adjust the nighttime temperature to be within the nighttime temperature range in response to determining that the nighttime temperature of the indoor farming environment is outside of the nighttime temperature range, determine whether a nighttime humidity of the indoor farming environment is within a nighttime humidity range, and adjust the nighttime humidity to be within the nighttime humidity range in response to determining that the nighttime humidity of the indoor farming environment is outside of the nighttime humidity range. In some implementations, the nighttime temperature range is between 72-75° F. In some implementations, the nighttime humidity range is between 55-60%.

In some implementations, the daytime temperature range is between 81-83° F. In some implementations, the daytime humidity range is between 55-60%. In some implementations, the daytime period is 12 hours long. In some implementations, the one or more plants include cannabis plants in the flowering stage. In some implementations, the light intensity is 1500 μmol/m²/s plus or minus a tolerance percentage.

These and other features of the present implementations will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
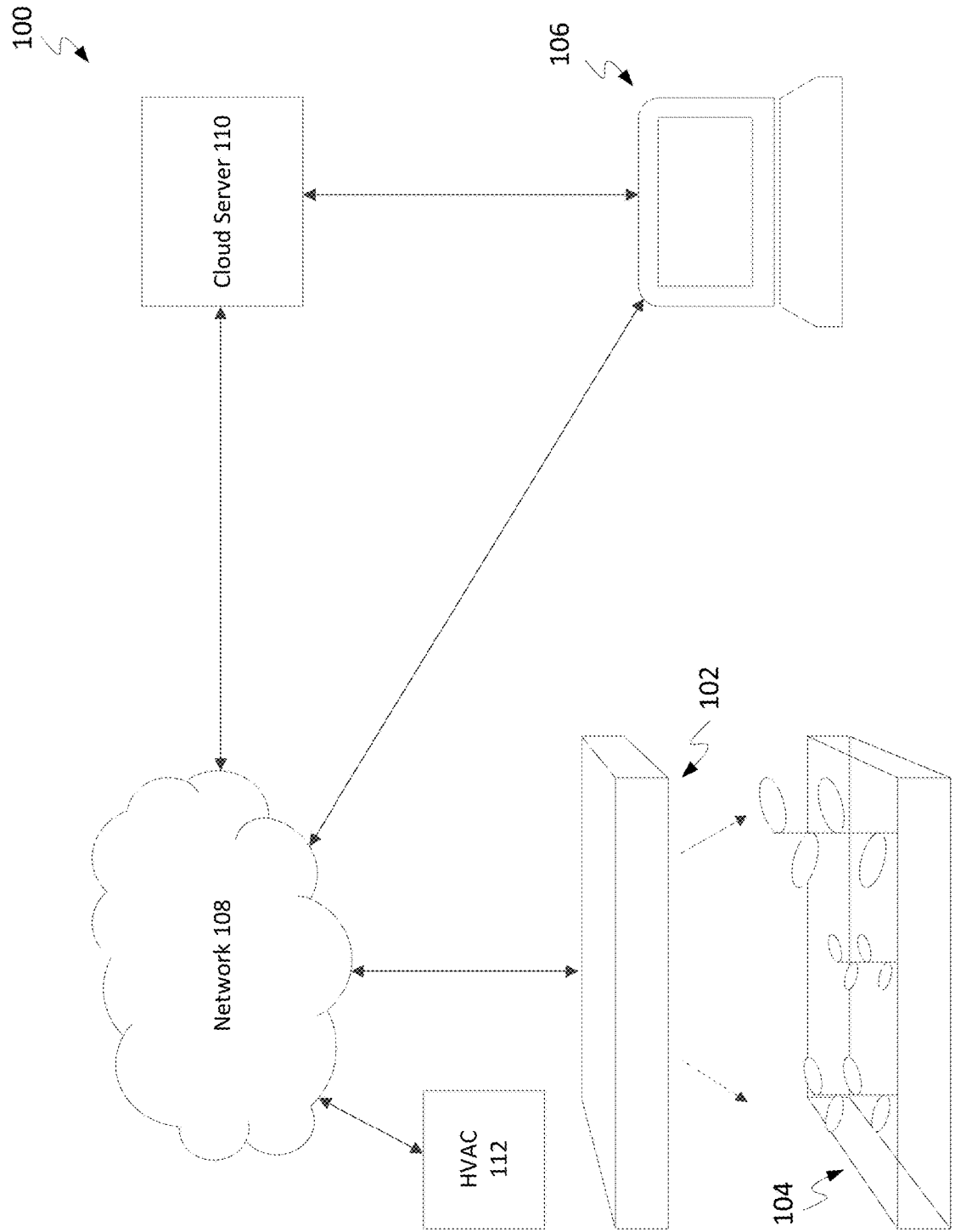
FIG. 1 is a block diagram illustrating a horticultural control system in accordance with various implementations.

FIG. 1 is a block diagram illustrating a horticultural control system 100 in accordance with various implementations. The horticultural system 100 may be located in an indoor farming environment, such as a greenhouse or vertical farm. The horticultural control system 100 may include one or more lighting fixtures 102. Each lighting fixture 102 may include a plurality of LEDs used to illuminate one or more plants 104 located in plant beds. In some implementations, various parameters of the light emitted by the lighting fixtures 102 may be adjusted by a controller or other device, such as intensity, color/wavelength, and color temperature.

The horticultural control system 100 may also include a computing device 106. The computing device 106 may be in part or in whole: (1) a laptop/notebook computer or subnotebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; (12) a combination of any one or more thereof, or any other electronic device that includes a processor and a memory. The computing device 106 may communicate with other components in the horticultural control system 100 via network 108. The network 108 may include one or more wide area networks (such as the Internet) and/or one or more local area networks (such as WiFi, Bluetooth, and Zigbee).

The computing device 106 may send and receive data from various components in the horticultural control system 100, such as the lighting fixtures 102, cloud server 110, and heating, ventilation, and air conditioning (HVAC) system 112. For example, the computing device 106 may receive light intensity data (e.g., PPFD values) from the lighting fixtures 112, and temperature and humidity data from the HVAC system 112. The computing device 106 may be used to control various components in the horticultural control system 100 as well. For example, a user may use the computing device 106 to set the PPFD values for the lighting fixtures 112, and the temperature and humidity levels for the HVAC system 112. The computing device 106 may also include a user interface for viewing data and for controlling the various components in the horticultural control system 100.

The computing device 106 may communicate with the cloud server 110, which may provide smart farming services for the horticultural control system 100. A user may use the computing device 106 to set automated environmental parameter schedules for the horticultural control system 100 via the cloud server 110. For example, a user may schedule when the lighting fixtures 102 are turned on and off, the light intensity or PPFD values that the lighting fixtures 102 emit while turned on, and may vary the light intensity or PPFD values depending on the time of day. In another example, a user may set temperature and/or humidity ranges for the indoor facility where the plants 104 are located depending on the time of day. These schedules may be stored in the cloud server 110, which executes the schedule automatically by communicating with and controlling the lighting fixtures 102 and the HVAC system 112.

The cloud server 110 may also be configured to provide other smart farming services. For example, the cloud server 110 may run data analytics on data received from the lighting fixtures 102 and the HVAC system 112. In another example, the cloud server 110 may store profiles for a plurality of plants 104. Each plant profile, or plant recipe, may include schedules for environmental parameters (e.g., light intensity, temperature, and humidity) that provide an optimal growth environment for the associated plant. A user that wants to grow a particular plant 104 may select the associated plant profile stored in the cloud server 110, and the cloud server 110 may be configured to automatically implement the environmental parameters and schedules dictated by the plant profile. In some implementations, the cloud service 110 may measure any natural sunlight entering the indoor farming environment and adjust the lighting fixtures 102 to supplement the total lighting received by the plants 104 based on the level of sunlight. For example, there may be photosensors placed near the windows to detect incoming sunlight, and the sensor data is transmitted to the cloud service 110. The cloud service 110 may also include energy management functions, logging and reporting functions, alert functions when environmental parameters exceed certain ranges, growth prediction functions, and may incorporate third party modules.

The horticultural control system 100 may include additional components not shown in FIG. 1. For example, the horticultural control system 100 may include a plurality of sensors that measure a plurality of different environmental parameters in the indoor farming environment, such as light intensity, temperature, and humidity. In some implementations, the HVAC system 112 may include a combined temperature control system and a humidity control system. In other implementations, the humidity control system is separate from the HVAC system 112 but is otherwise controllable by the cloud server 110 and/or computing device

106. The horticultural control system 100 may also include additional environmental control components, such as irrigation/water control.

Figure 2:
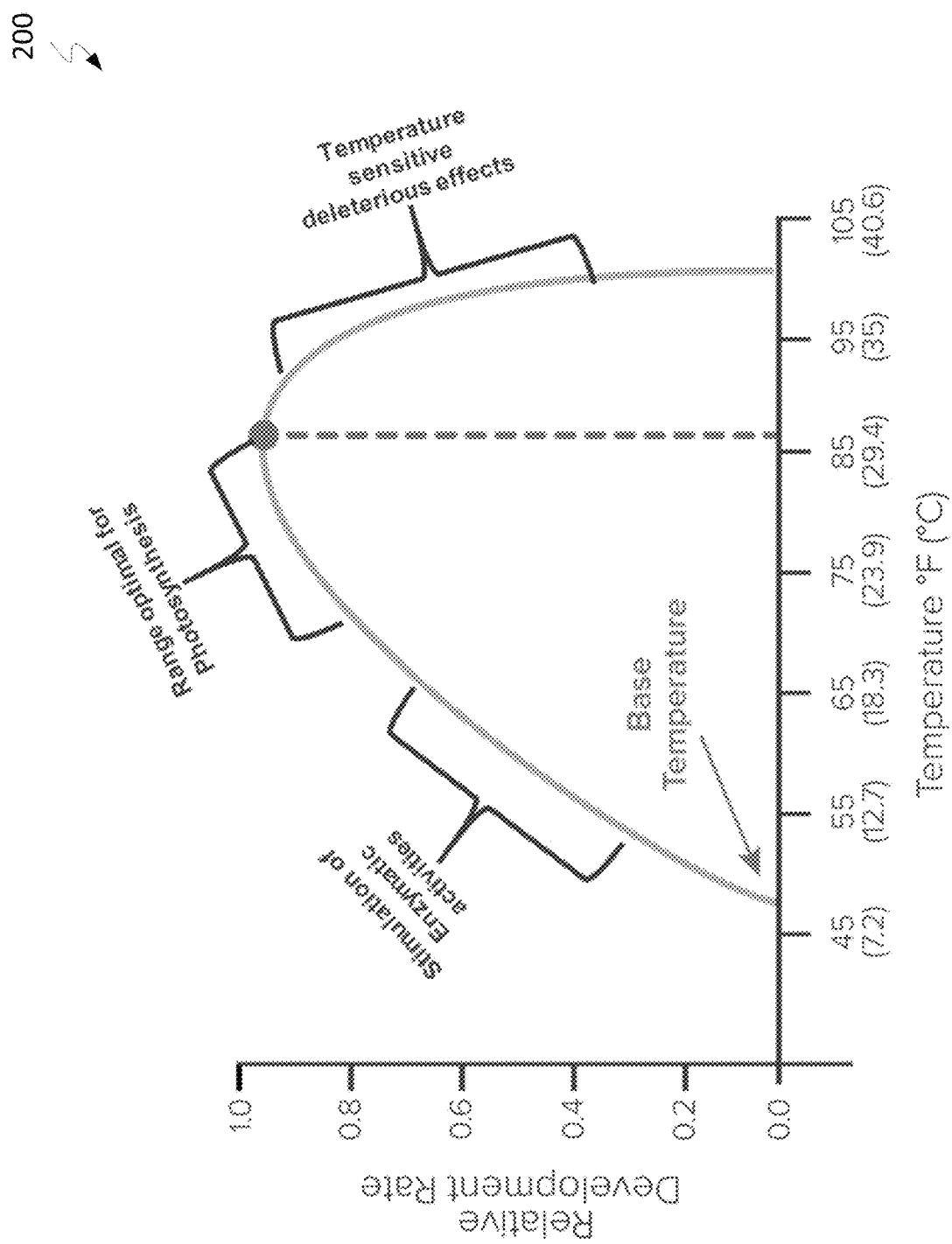
FIG. 2 is a graph illustrating rate of plant growth versus temperature in accordance with various implementations.

FIG. 2 is a graph 200 illustrating the relative rate of plant development versus temperature in accordance with various implementations. The graph 200 is a general representation of the relationship between temperature and plant growth, and is not indicative of any particular crop. As can be seen from FIG. 2, there is a range of temperatures at which the relative development rate approaches 1 (roughly around 86° F. in the graph 200), meaning the plant is growing at or near its maximum development rate at those temperatures. Outside this temperature range, both higher and lower, the relative development rate slows down. In particular, at higher temperatures there may be temperature-dependent negative effects on plants (e.g., tissue damage). The exact temperature range at which a plant's relative development rate is maximized depends on the exact type of plant and the exact stage of growth for that plant (e.g., sprout seedling, vegetative, budding, flowering, and ripening).

Figure 3:
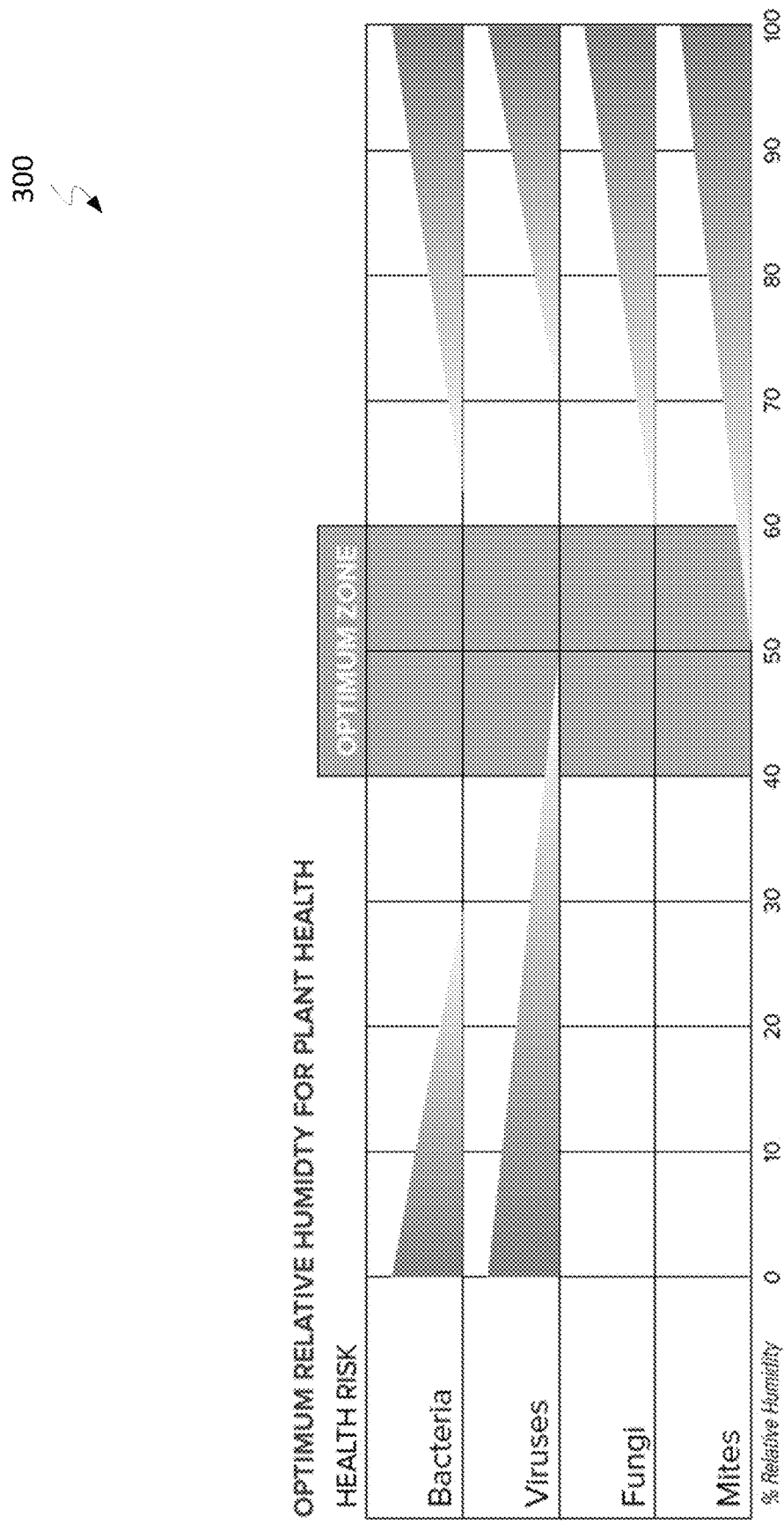
FIG. 3 is a graph illustrating the effect of humidity on different plant pests in accordance with various implementations.

Likewise, there is an optimal range of humidities for plant growth. FIG. 3 is a graph 300 illustrating the effect of humidity on different plant pests in accordance with various implementations. The graph 300 is a general representation of the relationship between humidity and various plant pests, and is not indicative of any particular crop. As can be seen from the graph 300, some forms of bacteria and viruses may thrive better on plants in low humidity, and some forms of bacteria, viruses, fungi, and mites may thrive better on plants in high humidity. There is a range of humidities (shown in graph 300 as between 40-60%) at which the growth and proliferation of bacteria, viruses, fungi, and mites is minimized. The exact humidity range at which a plant's pests are most inhibited depends on the exact type of plant and the exact stage of growth for that plant (e.g., sprout seedling, vegetative, budding, flowering, and ripening).

Figure 4:
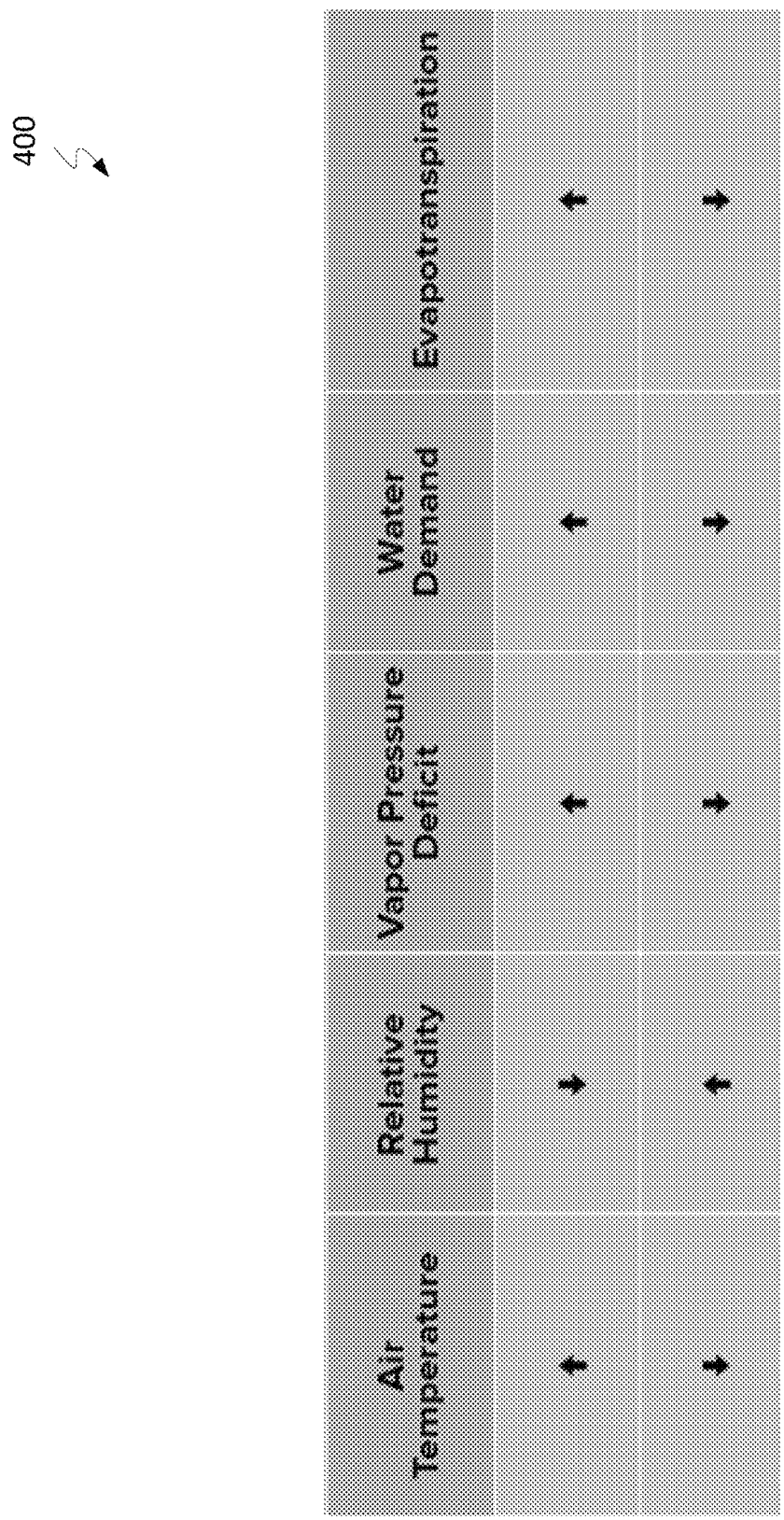
FIG. 4 is a chart illustrating the relationship between various environmental parameters in accordance with various implementations.

Temperature and humidity, as well as some other environmental parameters relevant to plant growth in an indoor farming environment, are interrelated. FIG. 4 is a chart 400 illustrating the relationship between various environmental parameters in accordance with various implementations. As can be seen from chart 400, there is a positive relationship between air temperature, vapor pressure deficit (VPD), water demand, and evapotranspiration, and a negative relationship between air temperature and relative humidity. Thus as temperature increases, relative humidity decreases. Thus one should be careful to balance environmental parameters, as changing one parameter to increase plant growth may also change other parameters in a way as to negatively affect plant growth.

As discussed previously, each type of plant has different PPFD ranges that are recommended for optimal growth at each stage of growth. For cannabis plants, the prior art teaches that the general recommended PPFD range is between 650-950 $\mu mol/m^2/s$, and PPFD values above 1000 $\mu mol/m^2/s$ are generally not recommended for cannabis growth. However, some recent studies have shown that crop yields increase when cannabis is illuminated at PPFD values as high as 1500 $\mu mol/m^2/s$. Thus there is an incentive for growers to grow cannabis under higher PPDF values.

However, when one environmental parameter is changed, other environmental parameters may also have to be changed to ensure optimal plant growth. In this case, if the light intensity of the light fixtures used to grow cannabis is increased, keeping the temperature and humidity of the indoor farm environment the same as for low light intensity values may not result in optimal cannabis growth.

Through experiments done in a number of growing facilities, the inventors have determined beneficial environmental parameters for cannabis during the flowing stage when illuminated at high PPFD values. Specifically, when cannabis is illuminated at a value of approximately 1500 $\mu mol/m^2/s$, the daytime temperature should be in the range of 81-83° F., the daytime relative humidity should be in the range of 55-60%, the nighttime temperature should be in the range of 72-75° F., and the nighttime humidity should be in the range of 55-60%. The duration of daytime during the flowering stage is approximately 12 hours, and therefore the duration of nighttime is also 12 hours. Growing cannabis within these environmental parameter ranges results in higher crop yields as compared to growing cannabis outside these ranges, given the same level of light intensity of 1500 $\mu mol/m^2/s$. While these environmental parameters may be manually monitored and changed by a person maintaining an indoor farming environment, it may also be automated (e.g., using a horticultural control system similar to the one described with respect to FIG. 1).

Figure 5:
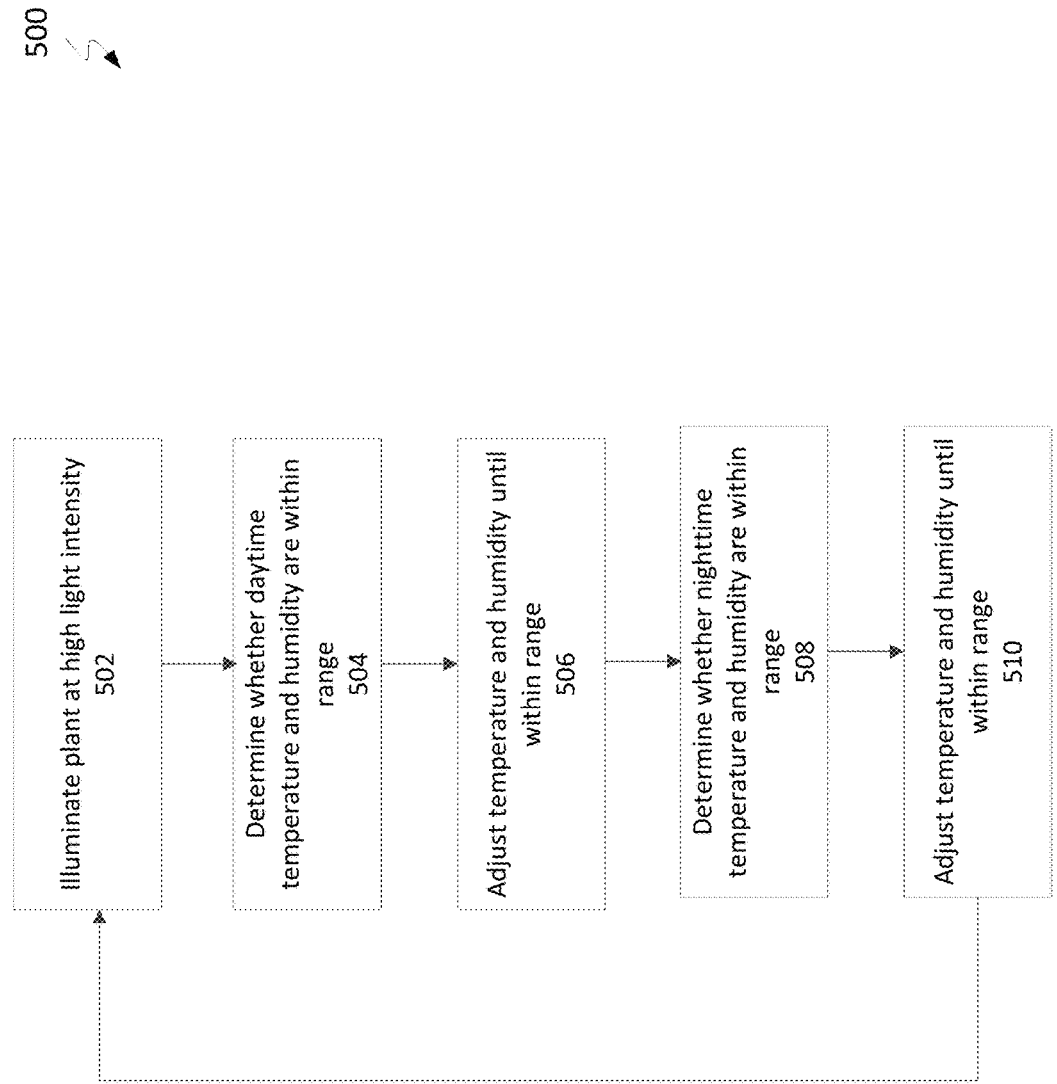
FIG. 5 is a flow chart illustrating a method of illuminating plants under high PPFD conditions in accordance with various implementations.

FIG. 5 is a flow chart illustrating a method 500 of illuminating plants under high PPFD conditions in accordance with various implementations. The method 500 may be performed by one or more components in a horticultural control system (e.g., computing device 106 or cloud server 110 in FIG. 1). In some implementations, the method 500 may be automated. In some implementations, the method 500 may be performed as part of a plant profile or recipe, which defines certain environmental parameter ranges and schedules for a particular plant species that a user is trying to grow in an indoor farming environment. The method 500 may be applied to cannabis plants during the flowering stage in particular.

In block 502, a plant located in an indoor farming environment is illuminated at a high light intensity during the daytime. In some implementations, the light intensity may be approximately 1500 $\mu mol/m^2/s$. In some implementations, the light intensity may be in a tolerance range centered around 1500 $\mu mol/m^2/s$, for example within a tolerance percentage of 2%, 5%, or 10% of 1500 $\mu mol/m^2/s$. With respect to cannabis plants in the flowering stage, daytime may be defined as a duration of 12 hours. For example, the horticultural control system may be configured to turn on the lighting fixtures during the daytime hours to illuminate the plants at a high light intensity.

In block 504, the horticultural control system may determine whether the daytime temperature and humidity in the indoor farming environment are within a prescribed range. The temperature and humidity may be measured by one or more sensors located in the indoor farming environment. For cannabis plants, the prescribed range for the daytime temperature may be between 81-83° F. and the prescribed range for the daytime humidity may be between 55-60%.

In block 506, the horticultural control system may adjust the daytime temperature and/or humidity of the indoor farming environment if they are outside the prescribed range. For example, the horticultural control system may control the HVAC system in the indoor farming environment to change the temperature and/or humidity until these parameters fall within the prescribed range.

In block 508, the horticultural control system may determine whether the nighttime temperature and humidity in the indoor farming environment are within a prescribed range. The temperature and humidity may be measured by one or more sensors located in the indoor farming environment. For cannabis plants, the prescribed range for the nighttime temperature may be between 72-75° F. and the prescribed range for the nighttime humidity may be between 55-60%. During nighttime for the plant, the lighting fixtures may be turned off to simulate natural nighttime. The duration of nighttime for cannabis plants in the flowering stage may be approximately 12 hours.

In block 510, the horticultural control system may adjust the nighttime temperature and/or humidity of the indoor farming environment if they are outside the prescribed range. For example, the horticultural control system may control the HVAC system in the indoor farming environment to change the temperature or humidity until these parameters fall within the prescribed range.

The method 500 may repeat blocks 502-510 during successive day and night cycles during maturation and harvest of the plants. In this manner, the method 500 implements optimal environmental parameters for the growth of certain plants in an indoor farming environment under high intensity lighting. The horticultural control system may also perform additional functions along with the method 500. For example, in some implementations the horticultural control system may store sensor data and display historical daytime and nighttime temperature and humidity to a user. In some implementations, the horticultural control system may send an alert to a user when the temperature and humidity exceed the prescribed range. In some implementations, the horticultural control system may allow a user to override the prescribed ranges, change the prescribed ranges, change the duration of daytime and nighttime, change the light intensity of the fixtures illuminating the plants, or make other adjustments to one or more environmental parameters.

OTHER CONSIDERATIONS

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, Blu-Ray, magnetic disk, internal hard drive, external hard drive, memory stick, flash drive, solid state memory device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some implementations, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s), handheld device(s) such as cellular telephone(s) or smartphone(s) or tablet(s), laptop(s), laptop/tablet hybrid(s), handheld computer(s), smart watch(es), or any another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The foregoing description of the implementations of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method of illuminating plants in an indoor farming environment, comprising:
    illuminating one or more plants using one or more lighting fixtures at a light intensity of approximately 1500 µmol/m$^2$/s during a daytime period, wherein each lighting fixtures comprises one or more light emitting diodes (LEDs);
    determining whether a daytime temperature of the indoor farming environment is within a daytime temperature range;
    adjusting the daytime temperature to be within the daytime temperature range in response to determining that the daytime temperature of the indoor farming environment is outside of the daytime temperature range;
    determining whether a daytime humidity of the indoor farming environment is within a daytime humidity range; and
    adjusting the daytime humidity to be within the daytime humidity range in response to determining that the daytime humidity of the indoor farming environment is outside of the daytime humidity range.

2. The method of claim 1, further comprising:
    turning off the one or more lighting fixtures during a nighttime period;
    determining whether a nighttime temperature of the indoor farming environment is within a nighttime temperature range;
    adjusting the nighttime temperature to be within the nighttime temperature range in response to determining that the nighttime temperature of the indoor farming environment is outside of the nighttime temperature range;
    determining whether a nighttime humidity of the indoor farming environment is within a nighttime humidity range; and
    adjusting the nighttime humidity to be within the nighttime humidity range in response to determining that the nighttime humidity of the indoor farming environment is outside of the nighttime humidity range.

3. The method of claim 2, wherein the nighttime temperature range is between 72-75° F.

4. The method of claim 2, wherein the nighttime humidity range is between 55-60%.

5. The method of claim 2, wherein the nighttime period is 12 hours long.

6. The method of claim 1, wherein the daytime temperature range is between 81-83° F.

7. The method of claim 1, wherein the daytime humidity range is between 55-60%.

8. The method of claim 1, wherein the daytime period is 12 hours long.

9. The method of claim 1, wherein the one or more plants comprise cannabis plants.

10. The method of claim 1, wherein the cannabis plants are in the flowering stage.

11. The method of claim 1, wherein the light intensity is 1500 µmol/m$^2$/s plus or minus a tolerance percentage.

12. A system for illuminating one or more plants in an indoor farming environment, comprising:
    one or more lighting fixtures configured to illuminate the one or more plants at a light intensity of approximately 1500 µmol/m$^2$/s during a daytime period, wherein each lighting fixtures comprises one or more light emitting diodes (LEDs);
    one or more sensors for measuring temperature and humidity in the indoor farming environment; and
    a processor coupled to the one or more lighting fixtures and the one or more sensors, the processor configured to:
        determine whether a daytime temperature of the indoor farming environment is within a daytime temperature range;
        adjust the daytime temperature to be within the daytime temperature range in response to determining that the daytime temperature of the indoor farming environment is outside of the daytime temperature range;
        determine whether a daytime humidity of the indoor farming environment is within a daytime humidity range; and
        adjust the daytime humidity to be within the daytime humidity range in response to determining that the daytime humidity of the indoor farming environment is outside of the daytime humidity range.

13. The system of claim 12, the processor further configured to:
    turn off the one or more lighting fixtures during a nighttime period;
    determine whether a nighttime temperature of the indoor farming environment is within a nighttime temperature range;
    adjust the nighttime temperature to be within the nighttime temperature range in response to determining that the nighttime temperature of the indoor farming environment is outside of the nighttime temperature range;
    determine whether a nighttime humidity of the indoor farming environment is within a nighttime humidity range; and
    adjust the nighttime humidity to be within the nighttime humidity range in response to determining that the nighttime humidity of the indoor farming environment is outside of the nighttime humidity range.

14. The system of claim 13, wherein the nighttime temperature range is between 72-75° F.

15. The system of claim 13, wherein the nighttime humidity range is between 55-60%.

16. The system of claim 12, wherein the daytime temperature range is between 81-83° F.

17. The system of claim 12, wherein the daytime humidity range is between 55-60%.

18. The system of claim 12, wherein the daytime period is 12 hours long.

19. The system of claim 12, wherein the one or more plants comprise cannabis plants in the flowering stage.

20. The system of claim 12, wherein the light intensity is 1500 µmol/m$^2$/s plus or minus a tolerance percentage.

* * * * *